US008558890B2

(12) United States Patent
Mrozek et al.

(10) Patent No.: US 8,558,890 B2
(45) Date of Patent: Oct. 15, 2013

(54) AERIAL RECONNAISSANCE CAMERA SYSTEM WITH ATMOSPHERIC DISPERSION CORRECTION

(75) Inventors: Fred Mrozek, Freeport, IL (US); Russell A. Bennett, McHenry, IL (US)

(73) Assignee: Goodrich Corporation, Charlotte, NC (US)

( * ) Notice: Subject to any disclaimer, the term of this patent is extended or adjusted under 35 U.S.C. 154(b) by 514 days.

(21) Appl. No.: 12/806,478

(22) Filed: Aug. 12, 2010

(65) Prior Publication Data

US 2012/0038769 A1    Feb. 16, 2012

(51) Int. Cl.
*H04N 7/18*    (2006.01)

(52) U.S. Cl.
USPC .......................................... 348/143; 348/142

(58) Field of Classification Search
USPC ................................................. 348/142–160
See application file for complete search history.

(56) References Cited

U.S. PATENT DOCUMENTS

| | | | | |
|---|---|---|---|---|
| 4,405,203 | A | 9/1983 | Wallner et al. | 350/168 |
| 4,913,549 | A | 4/1990 | Fujita et al. | 356/354 |
| 5,278,402 | A | 1/1994 | Wein | 250/201.9 |
| 5,412,200 | A | 5/1995 | Rhoads | 250/201.9 |
| 5,448,053 | A | 9/1995 | Rhoads | 250/201.9 |
| 5,999,326 | A | 12/1999 | Kastner | 359/643 |
| 6,038,068 | A | 3/2000 | Takeshi et al. | 359/399 |
| 6,084,227 | A | 7/2000 | Rhoads | 250/201.9 |
| 6,616,097 | B2 * | 9/2003 | Hilbert | 244/118.1 |
| 6,694,094 | B2 * | 2/2004 | Partynski et al. | 396/7 |
| 7,460,245 | B2 | 12/2008 | Hill | 356/517 |
| 7,612,805 | B2 | 11/2009 | Solomon | 348/222.1 |
| 7,626,152 | B2 | 12/2009 | King et al. | 250/201.9 |

OTHER PUBLICATIONS

Lareau et al. "Dual-band framing cameras: technology and status", Proc. SPIE 4127, Airborne Reconnaissance XXIV, 148 (Nov. 29, 2000).*
George Biddell Airy, "Note on Atmospheric Chromatic Dispersion as Affecting Telescopic Observation and on the Mode of Correcting it," Monthly Notices of the Royal Astronomical Society, London, vol. 29 No. 3, Jun. 1, 1869, pp. 333-337.*
Frank Eisenhauer, Atmospheric Dispersion Corrector <http://web.archive.org/web/20070820063126/http://www.mpe.mpg.de/ir/instruments/sharp2+/manual/node15.html>, Aug. 20, 2007.*
Thomas Dobbins, "AVA's Atmospheric Dispersion Corrector", (2005), Sky Pub. Corp, vol. 109, p. 88.*
International Search Report and Written Opinion in PCT/US2011/001087 dated Sep. 30, 2011.

(Continued)

*Primary Examiner* — Andy Rao
(74) *Attorney, Agent, or Firm* — Cantor Colburn LLP (57) ABSTRACT

An aerial reconnaissance camera system is disclosed which compensates for atmospheric dispersion. The dispersion is principally a function of the observing altitude and slant range and occurs in the camera depression direction only. The effective spectral dispersion of the atmosphere is shown to be about 15 microradians over the visible/near infrared spectrum (500 to 900 nanometers) at typical long range oblique photography (LOROP) imaging ranges. Consequently, dispersion is compensated by means of a fixed optical wedge incorporated into the optical path of the reconnaissance camera, e.g., in a fixed reconnaissance window. The wedge has dispersive qualities opposite to the effective net dispersion of the atmosphere for an expected reconnaissance mission using the camera.

26 Claims, 10 Drawing Sheets

(56) References Cited

OTHER PUBLICATIONS

Airy, George Biddell, *Note on Atmosphereic Chromatic Dispersion as affecting Telescopic Observations, and on the Mode of Correcting it*. Monthly Notices of the Royal Astronomical Society, vol. 29, No. 3, Jun. 1, 1869, pp. 333-337.

Written Opinion of the International Preliminary Examining Authority in PCT/US2011/001087 dated Jun. 25, 2012.

W.M. Smart, *Text-Book on Spherical Astronomy*, Cambridge University Press (1962), first edition published in 1931, Table of Contents, pp. 58-73.

Edlen *The Refractive Index of Air*, Metrologia, Vo. 2, No. 2, pp. 71-79 (1966).

Simon, George W., *A Practical Solution of the Atmospheric Dispersion Problem*, pp. 190-194, Astron. Jour., vol. 71, No. 3, Apr. 1966.

* cited by examiner

2.6 Index of Refraction

The equation for the index of refraction n is taken from Edlen[7] and is given by:

$$(n-1) \times 10^6 = \left[ a_c + \frac{a_1}{1-(\nu/b_1)^2} + \frac{a_2}{1-(\nu/b_2)^2} \right] \cdot \frac{(P-P_w)}{P_0} \cdot \frac{296.15}{T}$$

$$+ \left[ c_0 - (\nu/c_1)^2 \right] \frac{P_w}{P_0}$$

where $\nu$ is the wavenumber in $cm^{-1}$. P is the total pressure in mb, $P_w$ is the partial pressure of water vapor, $P_0$ is 1013.25mb, T is the temperature in Kelvin, and the constants a, b, and c are:

$a_0 = 83.43$, $a_1 = 185.08$, $a_2 = 4.11$

$b_1 = 1.140 \times 10^5$, $b_2 = 6.24 \times 10^4$ $c_0 = 43.49$, $c_1 = 1.70 \times 10^4$

---

7. Edlen, K. (1966) The refractive index of air, Metrologia 2:12.

ATMOSPHERIC DISPERSION USING A SINGLE LAYER MODEL

REFRACTION OF A PRISM

AERIAL RECONNAISSANCE CAMERA SYSTEM WITH ATMOSPHERIC DISPERSION CORRECTION

BACKGROUND

This invention relates generally to the field of aerial reconnaissance and more particularly to a method and construction of an aerial reconnaissance camera system which corrects for atmospheric dispersion. The methods are particularly advantageous for use in reconnaissance camera systems which are used to perform long range oblique photography from manned or unmanned reconnaissance aircraft. Certain aspects of the invention and methods may also have application to spaceborne cameras carried by satellites.

While it is only a thin layer in comparison to the diameter of the Earth, the atmosphere has a significant effect on the nature and quality of imagery collected while viewing through it. The atmosphere is far from benign as a transmission medium, and in fact introduces noise, attenuation, temporal variations, and aberrations into the light rays passing through it. This disclosure pertains to compensation for one of the consequences of viewing objects through this active medium, namely, atmospheric dispersion, which results in the spectral separation of imaging light rays transmitted through the Earth's atmosphere.

Refraction is defined as the bending of light rays passing from one medium to another, such as between air and water or air and glass, or between parts of the same medium with different densities such as the Earth's atmosphere. The amount of refraction is given by Snell's law and can be expressed in terms of the medium's refractive index, which is the ratio of the speed of light in a vacuum to that in the medium. Dispersion is the variation of the refractive index with the wavelength of the light.

Figure 1A:
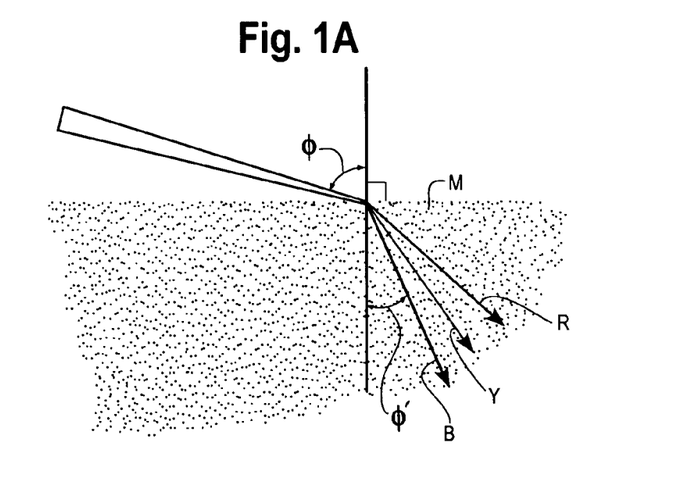
FIGS. 1A and 1B are illustrations of the dispersion produced by the atmosphere.
Figure 1B:
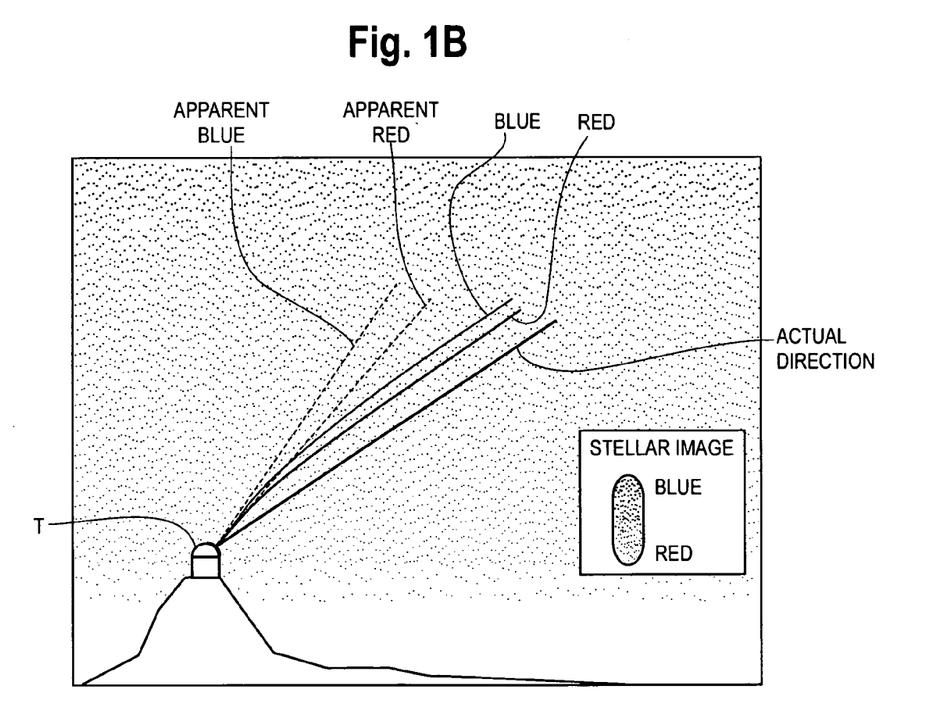

The phenomenon of atmospheric dispersion is illustrated for purposes of explanation in FIGS. 1A and 1B. FIG. 1A shows refraction at the surface of a dispersive medium such as glass, water or air. The light coming from the left is white light, containing all colors. When it reaches the surface with an angle of incidence $\phi$ with respect to the normal to the surface (vertical line) and enters the medium M, it is bent toward the normal and makes an angle $\phi'$ with respect to the normal. If the index of refraction inside the medium M is higher than outside, the difference $(\phi-\phi')$ is positive. The medium M in the illustration also has an index of refraction that is greater at shorter wavelengths (blue end of the visible spectrum) than at longer wavelengths (red end of the visible spectrum), and the blue light (B) is refracted through a greater angle than the yellow light (Y) and the red light (R).

The dispersive medium M could be the atmosphere of the Earth, where dispersion would refract blue light through a greater angle than the red light, as shown in FIG. 1A. The index of refraction of the atmosphere of the Earth is not constant, but rather is in proportion to the pressure, and so it decreases with increasing altitude. The path of light from a distant star through the atmosphere to a point on the ground (telescope T) is illustrated in FIG. 1B. Light approaching a surface observer from shallow elevation angles is refracted increasingly toward the vertical as it nears the observer. Its path through the atmosphere is a curved line as illustrated and blue light is deviated through greater angles than red. The difference in the angle of deviation from the actual direction (shown in FIG. 1B) is due to the refraction of the atmosphere. The difference in the apparent direction of the red and blue components of the light is due to the dispersion of the atmosphere. The dispersion created by the atmosphere blurs an image of the star taken by the telescope T, as indicated by the stellar image shown in the lower right of FIG. 1B.

In practical terms, atmospheric dispersion, if uncompensated, produces undesirable effects in reconnaissance imagery, including loss of spatial resolution and distortion of the shape of objects in imagery produced by a reconnaissance camera. In essence, the blurring shown in the lower right of FIG. 1B in the case of imaging a distant star also occurs in a reconnaissance image of a point on the Earth's surface taken from a reconnaissance camera located in an aircraft operating at high altitude.

Atmospheric dispersion as shown in FIGS. 1A and 1B has been of major interest to astronomers. Atmospheric dispersion, as a physical phenomenon, has been studied for over three centuries. Only within the last 150 years could atmospheric spectral dispersion be quantified in any significant detail. This level of detail is a result of a better understanding and measurements of the interaction of light and the atmosphere. One classical work on the subject is W. M. Smart, *Text-Book on Spherical Astronomy*, Cambridge University Press (1962), first edition published in 1931, which is still regarded as a definitive work. Smart illustrates two approaches to quantifying atmospheric dispersion, specifically (a) the use of the refractive invariant with a single layer model to calculate the zenith angle change through the atmosphere and (b) integrated ray tracing to find the zenith angle change. Another approach is to use the atmospheric model MODTRAN® to compute the bending angle of a line of sight from an altitude H to the ground. MODTRAN® is a computer program designed to model atmospheric propagation of electromagnetic radiation. It was developed by the US Air Force and Spectral Sciences Inc.

While methods for calculating or estimating atmospheric dispersion have been around for many years, practical methods for measurement and compensation of atmospheric dispersion have only recently evolved. These methods are mostly associated with the use of opto-mechanical and or electro-optical systems in conjunction with astronomical telescopes to provide compensation for atmospheric dispersion. One such electro-optical system employs light sensors such as photo detectors to capture incoming light rays, and an associated electronic signal processor calculates the amount spectral dispersion present. The signal processor then generates a dispersion correction signal which controls a "variable" dispersion compensating optical component placed in the optical path of the telescope. An example of a "variable" dispersion-compensating component is the Risley prism which is capable of changing its dispersion through precision movement of its optical elements which comprise two or more rotatable prisms or wedges. Therefore, when placed in the optical path of a telescope system, the optical compensating component introduces dispersion in opposition to the dispersion measured in the incoming light rays. If the amount of dispersion in the incoming light rays changes, the optic is commanded to adjust its "variable" elements to compensate accordingly. In these methods, the introduction of rotatable dispersive wedges or prisms is the principal means to compensate for dispersion.

Examples of prior art using variable optical atmospheric dispersion correction include Wallner et al., U.S. Pat. No. 4,405,203, Wein U.S. Pat. No. 5,278,402 and Takeshi et al U.S. Pat. No. 6,038,068. Wallner discloses an opto-mechanical system comprising a pair of single or a pair of compound (multiple) rotating prisms or wedges which correct for atmospheric dispersion in a telescope application. Wein, U.S. Pat. No. 5,278,402, at FIGS. 9 and 10, discloses an electro-optical dispersion correction system which includes a dispersion sensor comprising a complex multi-wavelength light detecting system. The dispersion sensor system generates a signal that is transmitted to a control circuit. The control circuit generates a control signal which drives a set of rotating prisms (a Risley prism) located within the optical system to reduce the sensed net dispersion to zero. Takeshi discloses an atmospheric dispersion correction lens arrangement for astronomical telescopes using a rotatable compound lens located within the telescope. Other related methods which compensate for aberrations caused by the atmosphere employ one or more image or light detectors to generate correction signals but do not utilize an optical aberration correcting component. Such methods rely on complex image processing algorithms that operate on frames of imagery previously captured and digitized by a camera to digitally remove the effects of the aberrations such as dispersion. One prior art example is Rhoads, U.S. Pat. No. 5,448,053.

While atmospheric dispersion correction in telescopes is known, the reconnaissance art has largely, if not entirely, ignored atmospheric dispersion as source of error and simply lived with the effects. There are several reasons for this, but the main one is that the variable optical compensator solutions disclosed in the above prior art are complex and costly, and would be extremely difficult to reliably integrate with the optical system of a current state of the art aerial reconnaissance camera.

Today's state of the art reconnaissance cameras are designed to produce extremely high resolution images, and the effects of atmospheric dispersion can no longer be ignored due to the spectral image smear present at the camera's image detector. However, apparently no practical solution for atmospheric dispersion correction in a reconnaissance camera has ever been proposed. The present invention provides a cost effective, uncomplicated, and easy-to-implement solution for compensating for atmospheric dispersion in an airborne reconnaissance camera system. As such, it is believed to represent a substantial advance in the art.

SUMMARY

Disclosed herein is an aerial reconnaissance camera system design which corrects for atmospheric dispersion with a fixed (non-variable) element optical component. The present invention does not use special sensors and signal processors to instantaneously measure the atmospheric dispersion, or variable optical components such as moving lenses, moving prisms and compound prisms, or other adjustable optics to correct for the atmospheric dispersion, or complex image processing algorithms to modify imagery previously obtained by the camera to correct for atmospheric dispersion.

In one aspect, the invention can be viewed as an improvement in an aerial reconnaissance camera system having an imaging detector such as an electro-optical imaging array for installation in an airborne reconnaissance vehicle. An optical path exists between a scene to be imaged on the Earth and the imaging detector in the camera. The improvement comprises incorporating an optical wedge or prism into the optical path of the reconnaissance camera. Unlike the prior art, the optical component comprises a fixed (non-moving) wedge, not a multiple wedge assembly or an assembly of multiple compound wedges configured to rotate or rotate with respect to each other to vary the optical dispersion properties, such as a Risley prism. The fixed wedge of the present invention functions to cancel out the atmospheric dispersion produced by the atmosphere between the reconnaissance aircraft and the scene on the ground.

The wedge of the present invention has a relatively thin edge and a relatively thick edge, with the wedge oriented in a manner such that the thinner edge is oriented towards the Earth and the thicker edge is oriented away from the Earth. This orientation can be simply viewed as having the thinner edge of the wedge "down" and the thicker side "up" relative to the camera field of view. The orientation is necessary in view of the fact that the dispersion produced by the atmosphere is in the camera depression angle direction only. The dispersion is principally a function of the observing altitude and corresponding slant range to scene on the ground. The effective spectral dispersion of the atmosphere is shown herein to be about 15 microradians for the visible/near infrared spectral band of 500 to 900 nanometers (nm), at typical long range oblique photography (LOROP) camera imaging ranges. Accordingly, the wedge has dispersive properties opposite from the expected net atmospheric dispersion in the optical path between the airborne reconnaissance vehicle and the image scene during a reconnaissance mission using the camera, e.g., approximately 15 microradians in one possible embodiment.

In one particular embodiment, the reconnaissance camera system includes a reconnaissance viewing window providing an interface between the reconnaissance camera and the environment (atmosphere) exterior of the reconnaissance vehicle. The window is in the form of, and functions as, the optical wedge. In other words, the window is constructed as a single, fixed wedge having the desired dispersive properties. The window may be installed on the reconnaissance vehicle or on a reconnaissance pod which houses the camera and is mounted external to the reconnaissance vehicle. In all cases the window is mounted relative to the camera field of view in the orientation such that the thin side of the wedge is "down" (closer to the Earth) and the thick side is "up" (farther from the Earth).

The amount of dispersion produced by the wedge is designed to be approximately equal to and opposite from the expected net dispersion produced by the atmosphere for a given reconnaissance mission. Some nominal value is typically chosen based on a "typical" or expected reconnaissance scenario for the camera, such as altitude of 30,000 feet and a range between the aircraft and the scene of say between 10 and 50 nautical miles (NMi). The invention is particularly applicable for long range oblique photography (LOROP) cameras which operate under similar mission scenarios. In such embodiments, the wedge produces a dispersion of between 10 and 30 microradians for incident light having a wavelength of between 500 and 900 nanometers. As another example, the wedge may be designed to have a nominal dispersion of 15+/−5 microradians for incident light having a wavelength of between 500 and 900 nanometers.

In the preferred embodiment, where the wedge is incorporated into the reconnaissance window, the material for the wedge/window may be any transparent material that is otherwise suitable to use as a window, such as Cleartran™, a zinc sulfide optical material available from Rohm & Haas, a subsidiary of The Dow Chemical Co. The wedge design parameters make use of the inherent dispersion properties of the window material in the wavelength(s) of interest.

BRIEF DESCRIPTION OF THE FIGURES

In FIG. 2A the wedge is shown schematically for purposes of illustration.

FIGS. 9A and 9B are plots of the refractive indices of Cleartran™ and N-BK7 glass, respectively, as a function of wavelength.

DETAILED DESCRIPTION

Figure 2A:
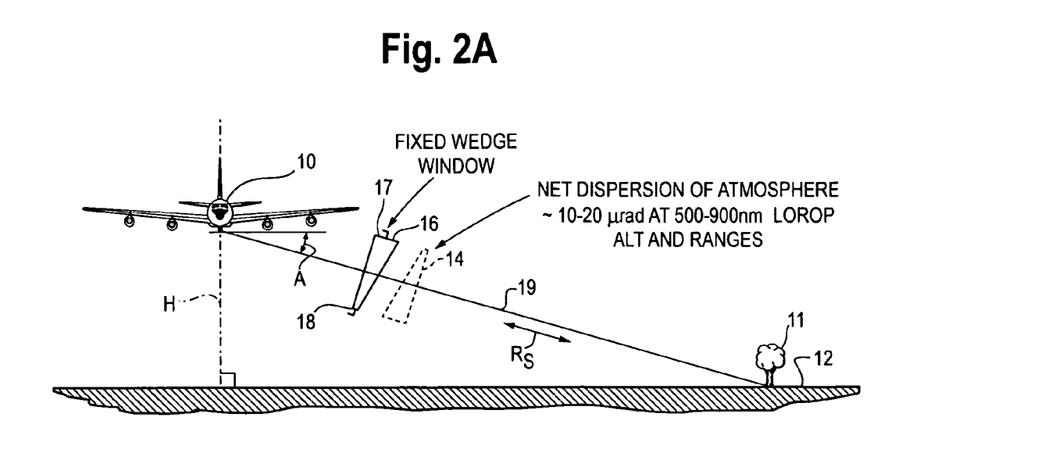
FIG. 2A is an illustration of an aerial reconnaissance vehicle with the net atmospheric dispersion shown as a wedge in dashed lines, and a compensating wedge which is incorporated into an aerial reconnaissance camera system carried by the aircraft.
Figure 2B:
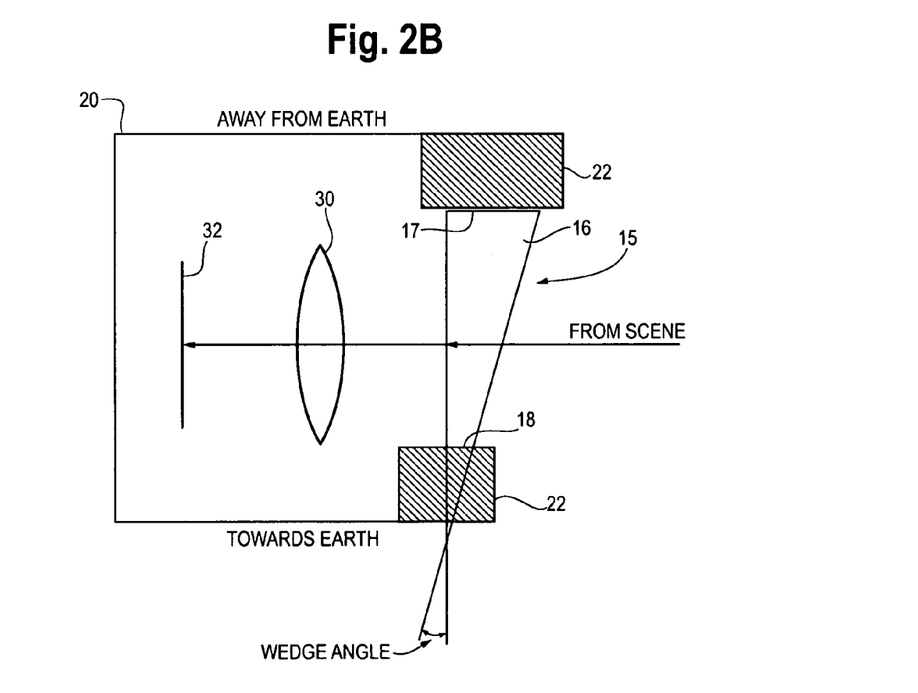
FIG. 2B is a side view of an aerial reconnaissance camera system showing a reconnaissance viewing window in the form of a single, fixed wedge which compensates for the dispersion produced by the atmosphere as shown in FIG. 1.

FIG. 2A is an illustration of an aerial reconnaissance vehicle 10 flying over the Earth 12 at altitude H and at slant range $R_S$. The reconnaissance vehicle or an appurtenance such as a reconnaissance pod carries aerial reconnaissance camera 20 shown in FIG. 2B. Camera 20 is pointed at object 11 on the ground 12 with a depression angle of A. In a typical embodiment of Long Range Oblique Photography, H is on the order of 20,000-40,000 feet and $R_S$ is 20-50 nautical miles. These values are of course not particularly critical. The dispersive effect of the atmosphere is represented by a wedge 14. In accordance with one aspect of this invention, a single, fixed compensating optical wedge 16 is incorporated into the aerial reconnaissance camera system carried by the aircraft. In FIG. 2A the wedge 16 is shown schematically for purposes of illustration. The wedge 16 may take the form of a window separating the camera optical elements from the atmosphere external of the aircraft or reconnaissance pod as shown in FIG. 2B.

The wedge 16 is designed such that the dispersion produced by the wedge 16 is approximately equal to and opposite from the wedge 14 representing the net atmospheric dispersion, as indicated by the orientation of the wedges shown in FIG. 2A. In designing the wedge 16, the dispersive qualities of the wedge material must be taken into account. Unlike the prior art, the wedge does not move, its optical properties are fixed and not variable, no control circuits or sensors are needed to actively calculate current atmospheric dispersion, and there is no need for dispersion correction to occur via software after an image has been captured by the image detector in the camera.

The wedge has a relatively thin edge 18 and a relatively thick edge 17, with the wedge 16 oriented in the camera in a manner such that the relatively thin edge 18 is oriented towards the Earth and the relatively thick edge 17 is oriented away from the Earth, as shown in FIG. 2A. In this orientation, the wedge has dispersive properties approximately opposite from the expected net atmospheric dispersion in the optical path 19 between the airborne reconnaissance vehicle 10 and the scene 11 during a reconnaissance mission using the camera.

Figure 6:
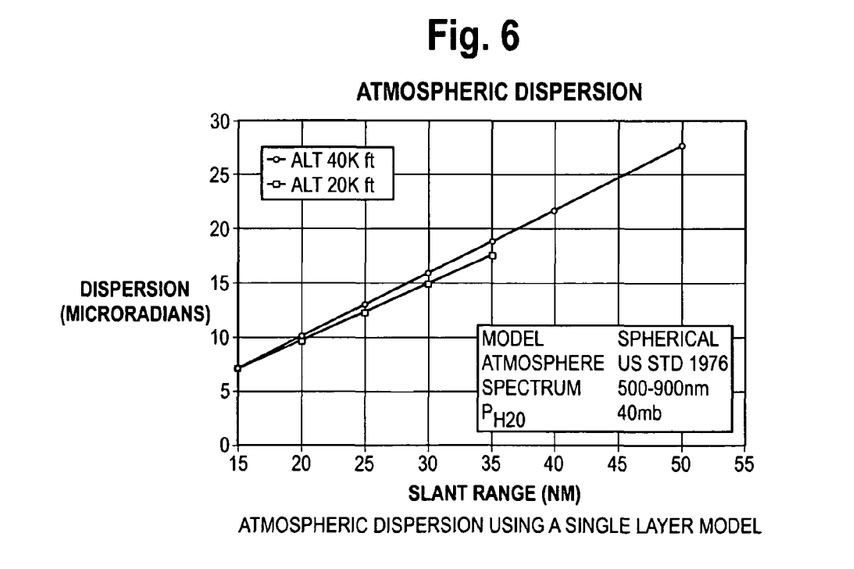
FIG. 6 is a plot of atmospheric dispersion as a function of slant range using the single layer model of Smart and shown in FIG. 3. The curves indicate the difference in the refraction angles for light over the spectral band of 500 nm to 900 nm at two altitudes.

The dispersive properties required for the wedge 16 are calculated to compensate for the spectral dispersion of the atmosphere for a "typical" reconnaissance mission for the camera system 20 based on the height above the Earth, range to the targeted scene, and spectral band of operation. The wedge is then manufactured to produce such properties. The effective spectral dispersion of the atmosphere is shown in FIG. 6 to be about 15 microradians for the visible/near infrared spectral band of 500 to 900 nanometers, at a typical long range oblique photography (LOROP) imaging slant range of 30 nautical miles, and hence in one embodiment the wedge 16 is designed to produce the same 15 microradians of dispersion but in opposition to the amount of atmospheric dispersion.

FIG. 2B is a side view of an aerial reconnaissance camera system 20 installed in the reconnaissance vehicle 10 of FIG. 2A. The camera system 20 includes a reconnaissance viewing window 15 having frame 22; the window 15 separates the camera from the atmosphere external of the reconnaissance vehicle. The window 15 could take the form of the window in a reconnaissance pod, as is known in the art. See for example U.S. Pat. No. 6,616,097. The window 15 is in the form of a single, fixed optical wedge 16. The wedge 16 compensates for the dispersion produced by the atmosphere 14 as shown in FIG. 2A. The thick side 17 of the wedge 16 of window 15 is "up", i.e., away from the Earth, and the thin side 18 is "down", i.e., towards the Earth, in order for the wedge 16 dispersion to cancel out the net dispersion of the atmosphere. The camera also includes an objective optical element 30 (details of which are not important and can vary widely) and a focal plane imaging detector 32. In the illustrated embodiment, the imaging detector 32 is an electro-optical image detector array which operates in the spectral band between 500 and 900 nanometers. Alternatively the image detector could be film in which case the relevant spectral bandpass would likely be narrower. The design of the camera 20 is not critical and hence it is shown schematically in FIG. 2B. The camera 20 could take the form of a scanning camera, a framing camera, a single band Camera, a multi-band band camera having multiple optical paths and multiple detectors operating in multiple wavebands, or other format, the details of which are not important for this invention and therefore are omitted for sake of brevity. The nature of the objective element 30 is also not important and could take the form of a reflective system such as a Cassegrain mirror assembly, a refractive system with a lens or lenses, a combination thereof, or other image forming optical component or components known in the art.

The design of the wedge 16 of FIGS. 2A and 2B, and selection of the amount of dispersion that wedge 16 produces, is arrived at in view of the amount of atmospheric dispersion that will be encountered in reconnaissance missions using the camera. This section of this document will explain how the atmospheric dispersion can be calculated, and thus how much corrective dispersion should be introduced into the wedge 16, taking into account any inherent dispersive properties the wedge material may have. Persons skilled in the art will be able to adapt the calculations and plots explained herein to any given reconnaissance mission scenario and design a dispersion correction wedge 16 accordingly.

In the following discussion, atmospheric dispersion is quantified for typical long-range reconnaissance camera scenarios. Three different methods were used to calculate the atmospheric dispersion over the visible/near infrared (V/NIR) spectrum (500-900 nm). The calculated values for all three methods were in agreement being 10 to 20 μrad for typical LOROP reconnaissance altitudes and slant ranges of 20 to 40 nautical miles. The three methods used for the dispersion calculations were: (1) single layer model with refractive invariant to calculate the zenith angle change through the atmosphere; (2) integrated ray tracing to find the zenith angle change; and (3) MODTRAN® atmospheric model to compute the bending angle of a line of sight from an altitude H to the ground.

Method 1

Calculation of Atmospheric Dispersion Applicable to Reconnaissance Camera Missions Using the Single Layer Model Calculation and the Refractive Invariant The single layer refractive invariant method treats the Earth as a sphere and the atmosphere as a series of spherical shells, each with a different index of refraction. The geometry is illustrated in FIG. 29 of the Smart textbook cited earlier, and reproduced in FIG. 3 of the appended Figures to this document, where incoming light along the line LA in layer M', which has an index of refraction μ', intersects layer M, which has an index of refraction, μ. At point P, the angle of incidence is φ', and the angle of refraction is ψ. The line CP from P to the center of the Earth is, of course, orthogonal to the boundary between layers M' and M. At the bottom of layer M, the refracted ray makes an angle of incidence φ with CQ, the radius drawn from the center of the Earth.

Figure 3:
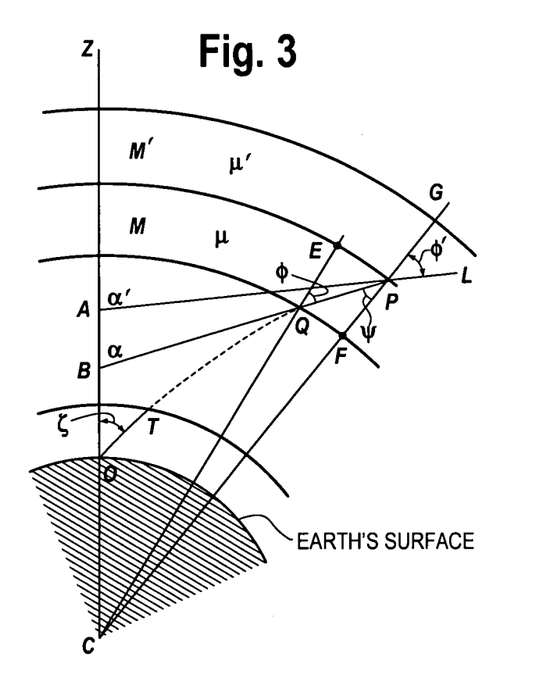
FIG. 3 is a layered model of the Earth's atmosphere showing the angles involved in calculating spectral dispersion according to Smart, Text-Book on Spherical Astronomy.

From the laws of refraction, $$\mu' \sin \phi' = \mu \sin \psi \qquad (1)$$

And from triangle CQP, in which CP=r', CQ=r, and CQP=180−φ, $$r \sin \phi = r' \sin \psi \qquad (2)$$

Eliminating $\sin \psi$ from (1) and (2), $$r'\mu' \sin \phi' = r\mu \sin \phi \qquad (3)$$

This is a general relation that holds for any two contiguous layers and specifically for any two layers whatever their height above the Earth.

At the surface of the Earth, r=$R_0$, (the radius of the Earth) and μ=$\mu_0$, (the refractive index of the atmosphere at sea level) and therefore $$r\mu \sin \phi = R_0 \mu_0 \sin \xi \qquad (4)$$

The right hand side of equation 4 is a fixed number as soon as the angle ξ is chosen, and is, therefore, an invariant. Equation 4 is the definition of the refractive invariant model for atmospheric refraction.

Results—Method 1

Figure 4:
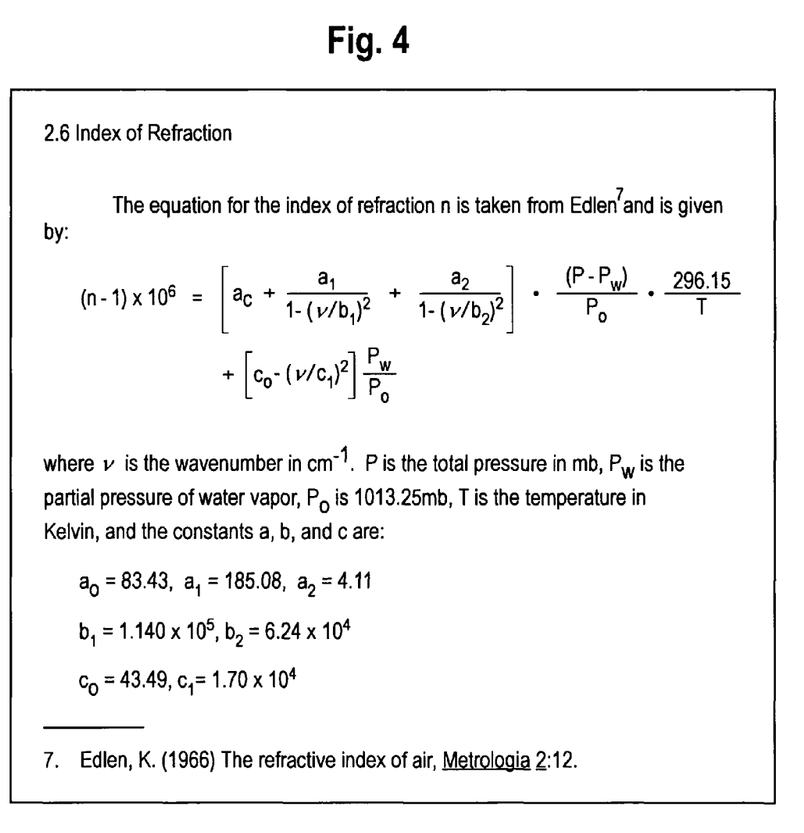
FIG. 4 is the equation and constants for calculating the index of refraction of the Earth's atmosphere according to The Refractive Index of Air, Bengt Edlen, Metrologica 2, 71-80 (1966).
Figure 5:
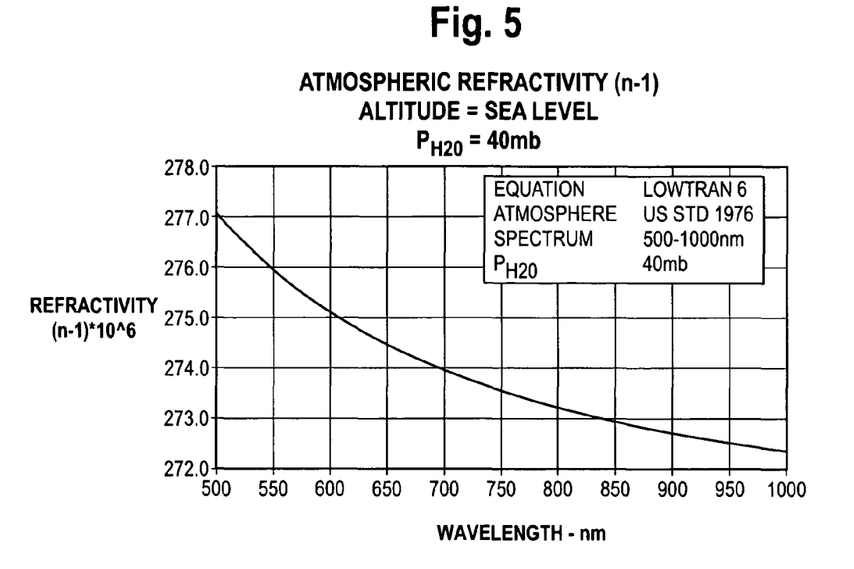
FIG. 5 is a plot of atmospheric refractivity as a function of wavelength as calculated from the equation in FIG. 4.

Equation 4 allows the calculation of angles φ and ξ if the index of refraction of the atmosphere, μ is known as a function of height above the earth. One way of using equation 4 is to treat the atmosphere as a single layer having an index $\mu_0$ that extends from the surface of the earth to an altitude of interest. Above the altitude of interest, the index is μ. For the refractive index of the atmosphere, we use the Edlen (1966) equation shown in FIG. 4. Using the Edlen equation, the atmospheric refractivity at sea level ($\mu_0$−1) as a function of wavelength is shown in FIG. 5. Because of the dependence of the atmospheric refractive index on atmospheric pressure, the calculation of the refractive index above sea level requires knowledge of the pressure at the altitude of interest. Using the US Standard Atmosphere (1976) to define the pressure as a function of altitude, we calculate the resultant difference between φ and ξ over the spectral range 500 nm to 900 nm. This is shown in FIG. 6 for two different altitudes, 20,000 ft and 40,000 ft. The weak dependence of the dispersion on altitude is evident from the small separation of the dispersion curves for 20,000 ft and 40,000 ft altitude in FIG. 6.

To summarize, using equation 4 and the atmospheric refractivity, the atmospheric dispersion was calculated using the refractive invariant model. The dispersion angle for a spectral bandwidth of 500 to 900 nm was calculated for several slant ranges from altitudes of 20,000 ft and 40,000 ft. FIG. 6 shows that the dispersion is greater from higher altitudes where there is a greater air mass below the camera. The effect of the greater air mass overcomes the effect of shallower depression angle for a given slant range from a lower altitude.

Method 2

Calculation of Atmospheric Dispersion Applicable to Reconnaissance Camera Missions Using the Ray Tracing Method The second method for estimating atmospheric dispersion is to use ray tracing from the observer elevation to the ground using the general expression for refraction.

This method is developed in page 36 of the Smart text book reference and results in equation 20 of that text. The zenith angle Z at altitude is given by $$Z = Z_0 \mu_0 \sin \zeta \int_1^{\mu_0} d\mu \Big/ \left[ \mu (r^2 \mu^2 - R_0^2 \mu_0^2 \sin^2 \zeta)^{\frac{1}{2}} \right]. \qquad (5)$$

where $Z_0$ is the zenith angle at the ground

To evaluate this equation, it is necessary to know the relationship between μ and r over the path from the observer to the ground (equivalently, over the path as μ varies from its value at the starting altitude (nominally 1) and $\mu_0$ (at the ground). There have been numerous analyses of atmospheric refraction and dispersion. However, quantification of the effects is dependent on an adequate model of the atmosphere that describes its physical properties such as temperature, pressure, density and index of refraction as a function of altitude and constituent population. Again we use the US Standard Atmosphere (1976) and the Edlen formula for atmospheric index of refraction in FIG. 4.

Results—Method 2

Now, using the equations for atmospheric refractive index μ as a function of wavelength and of altitude, the relationship between μ and r=($R_0$+altitude) can be calculated, and dg/dr can be calculated. Then, equation 5 can be evaluated for specific wavelengths and for specific camera altitudes H and slant ranges $R_S$.

Figure 7:
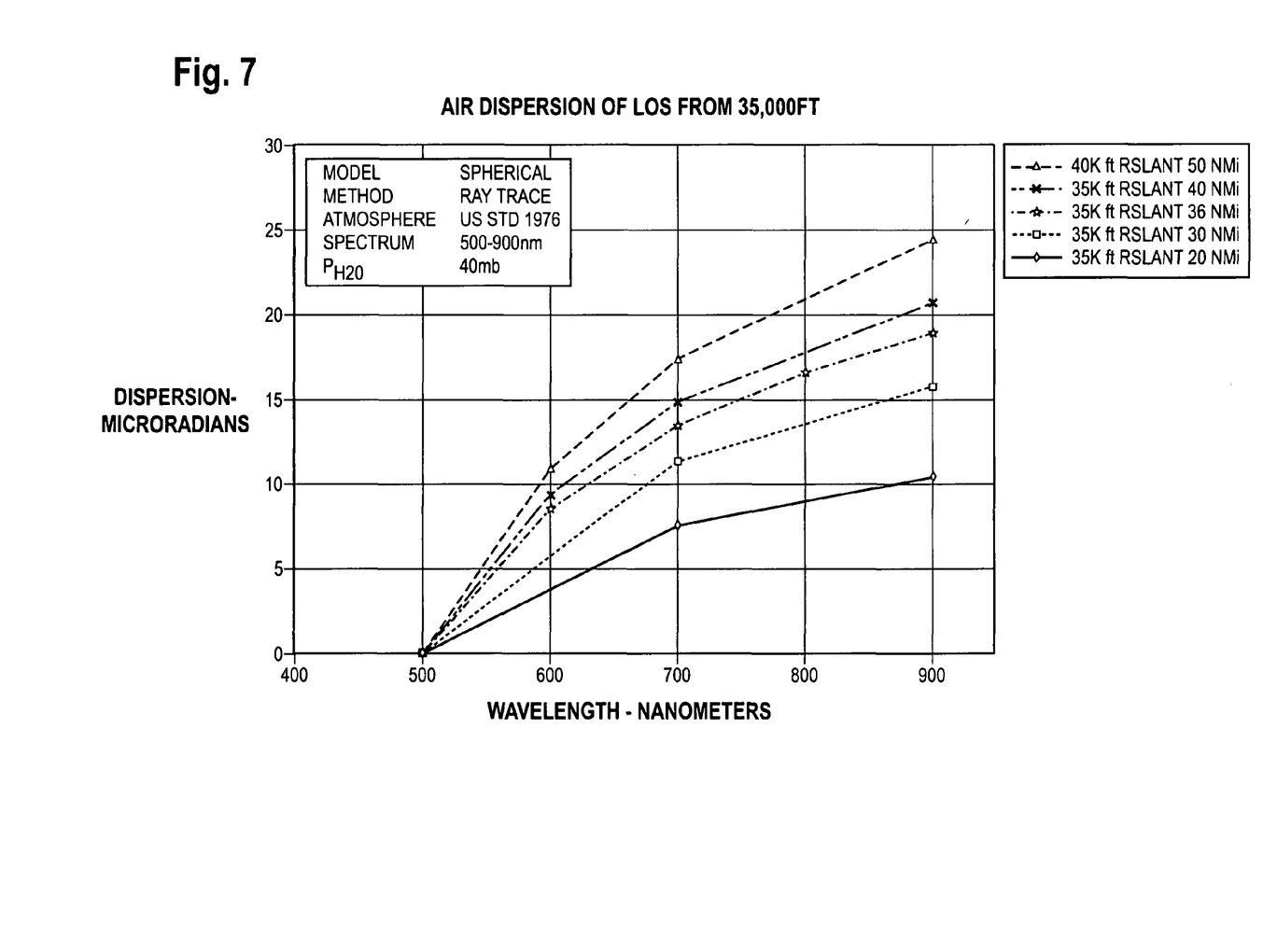
FIG. 7 is a plot of atmospheric dispersion as a function of the line of sight (LOS) slant range at an altitude of 35,000 feet.

The dispersion which is the integrated change in zenith angle (Z−$Z_0$) is shown in FIG. 7 for line of sight (LOS) slant ranges from 20 to 40 nautical miles from an altitude of 35,000 ft. For convenience, the changes in zenith angle are referenced to a light wavelength of λ=500 nanometers.

In comparing the dispersions shown in FIGS. 6 and 7, it is evident that the results are quite similar, even though the methods are rather different. For example, in FIG. 6, at 30 nautical miles slant range, the dispersion is between 15 and 16 µrads. In FIG. 7, the dispersion at 30 nautical miles slant range is shown to be 16 µrads.

Method 3

Figure 8:
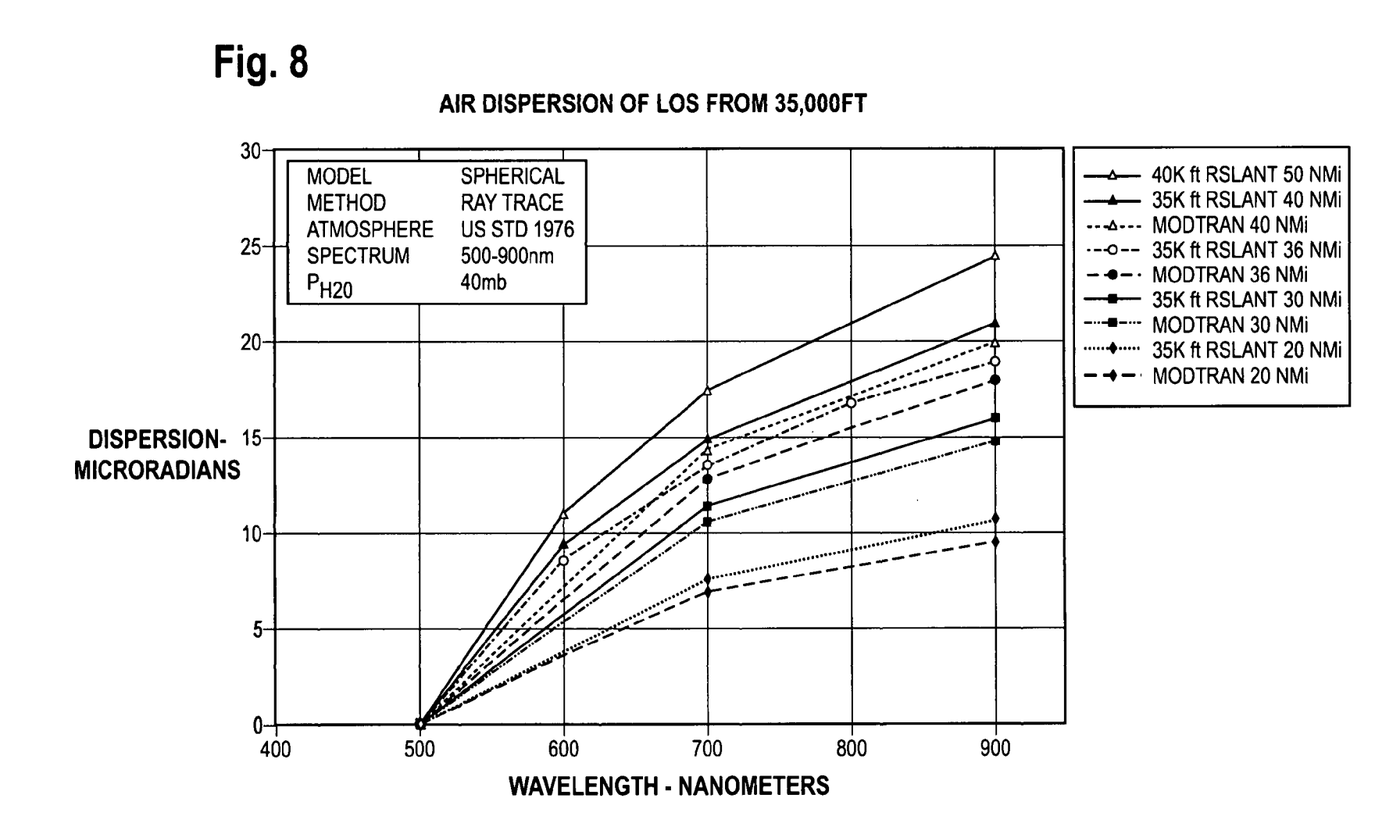
FIG. 8 is a plot of atmospheric dispersion as a function of wavelength, showing a comparison of the MODTRAN® and Ray Tracing methods of calculating atmospheric dispersion at typical LOROP ranges.

Calculation of Atmospheric Dispersion Applicable to Reconnaissance Camera Missions Using MODTRAN® Computer Modeling The third method of calculation, ray tracing using MODTRAN, yields a dispersion prediction that is very similar to method 2. This is illustrated in FIG. 8, which shows in dotted lines the results of ray tracing with MODTRAN vs. ray tracing using method 2. The worst case difference is less than 3 micro radians between the two methods.

Results—Method 3

The Modtran calculation and the ray trace calculation of dispersion produce similar results, since the formula for the critical parameter, the refractive index of air, is the same in both formulations. (FIG. 4.)

One way of checking the validity of the results obtained from these three methods is by comparison with equivalent calculations that have been verified by observation. The above dispersion calculations were compared with those of G. W. Simon whose dispersion predictions using ray tracing were confirmed by astronomical measurement to be within ±0.14 second of arc. The observations were made by J. W Evans at 9,220 feet at the Sacramento Peak Observatory and reported by Simon in Simon, George W., *A Practical Solution of the Atmospheric Dispersion Problem*, p. 190-194, Astron. Jour., 71 Apr. 1966.

Dispersion values for sea level and 9,220 feet elevation were calculated using the ray tracing method described above and then compared with Simon's calculations for the same cases. The agreement between the dispersion predicted by ray tracing and the results reported by Simon is very good as shown in table 1 below. The average difference between the above ray tracing method and Simon's method is less than 2 microradians.

TABLE 1

Dispersion Comparison with Simon

|  | Case 1 | | Case 2 | |
| --- | --- | --- | --- | --- |
| Starting Altitude (ft) | ∞ | | ∞ | |
| Ending Altitude (ft) | Sea Level | | 9,220 | |
| Zenith Angle (deg) | 80.000 | | 80.000 | |
| (Referenced to 400 nm) Wavelength nm | Dispersion Prediction by Ray Tracing arc sec | Dispersion Prediction by Simon arc sec | Dispersion Prediction by Ray Tracing arc sec | Dispersion Prediction by Simon arc sec |
| 300 | −9.8 | −10.0 | −7.3 | −7.5 |
| 400 | 0.0 | 0.0 | 0.0 | 0.0 |
| 440 |  |  | −0.5 | 0.5 |
| 500 | 4.2 | 4.0 | 3.1 | 3.0 |
| 600 | 6.5 | 6.0 | 4.8 | 5.0 |
| 700 | 7.8 | N/A | 5.8 | N/A |
| 800 | 8.6 | 8.0 | 6.4 | 7.0 |
| 1100 | 9.9 | 9.5 | 7.3 | 7.5 |
| Average Absolute Difference | 0.43 arc sec | | 0.38 arc sec | |

The single layer method will likewise give a similarly precise result, since it yields results very close to the ray tracing method. Summarizing then, all three methods presented here for the calculation of atmospheric dispersion yield results that are very similar to each other and which are in close agreement with the Simon predictions which were validated using astronomical measurements.

The three methods of calculation just described made use of uniform spectral weighting over the spectral band of interest. To be analytically more precise, the calculation of the dispersion of the air should be spectrally weighted according to the intensity of the radiation leaving the target, the transmission of the atmosphere and the camera optical system, and the spectral sensitivity of the image detector. For general reconnaissance use and in the context of this invention, uniform weighting provides an adequate estimate of the dispersion of the atmosphere. However for specific applications where the spectral content of the target is uniquely different, spectral weighting may be required for the most accurate calculation.

Camera System Wedge 16 Design

Given any one of the three aforementioned methods for calculating atmospheric dispersion, a practical solution to compensating for atmospheric dispersion in a reconnaissance camera system scenario can take the form of a single, fixed optical wedge (16, FIGS. 2A and 2B) as described herein. The optical wedge is placed in the optical path of the camera and is designed as part of the reconnaissance camera system, such as forming the camera viewing window in a reconnaissance vehicle or a reconnaissance pod mounted externally on the vehicle. See the discussion of FIGS. 2A and 2B, supra.

The wedge is designed to provide a compensating dispersion over a significant part of the operating region in an expected reconnaissance mission. For dual-band reconnaissance camera systems operating in the visible and near infrared (V/NIR) spectrum (500-900 nm) and in the middle wave infrared (MWIR) spectrum (3.0-5.0 µm), Cleartran™ is the window material of choice, since it has a significant inherent dispersion in the V/NIR which can be used to advantage, and very little dispersion in the MWIR. By providing a window with the opposite effective wedge of the atmosphere, the dispersions can effectively cancel each other out. Because atmospheric dispersion is greatest near the horizon, the corrective wedge must always be oriented with the thick side of the wedge up. This fact is important when utilizing a single reconnaissance viewing window that is moveable from one side of the aircraft or pod to the other. Such a window cannot compensate for atmospheric dispersion on both sides of the aircraft if the wedge orientation in the window inverts from left side to right side viewing. In other words, a moveable window which covers 0°-180° in depression across both sides of aircraft nadir cannot be used to nullify atmospheric dispersion if the wedge inverts when crossing nadir, as is typical. This would undesirably double the dispersion of the atmosphere on one side of nadir while cancelling it out on the other side of nadir.

Figure 9A:
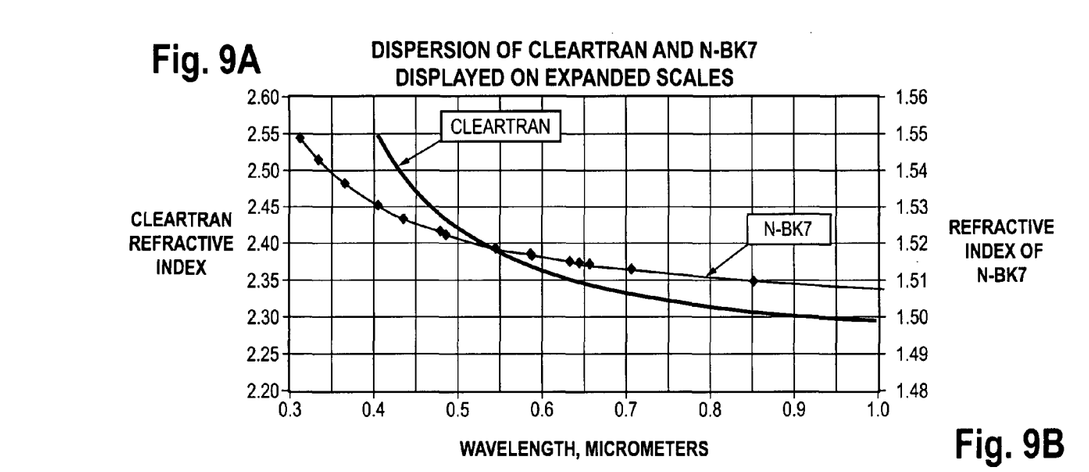
Figure 9B:
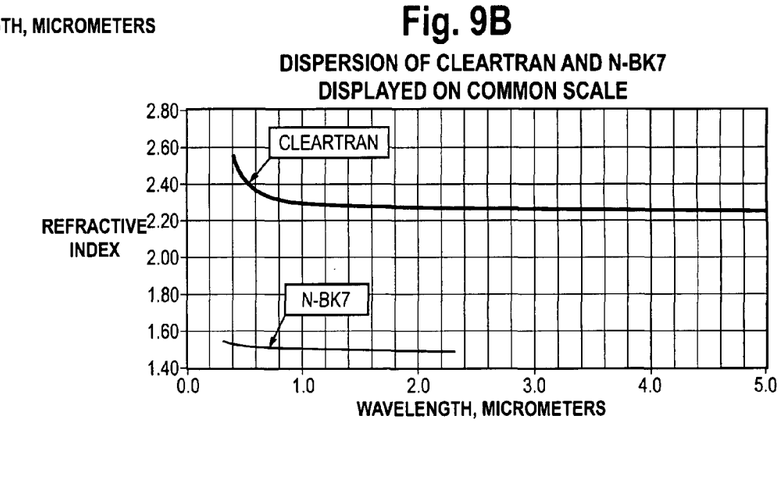
Figure 10:
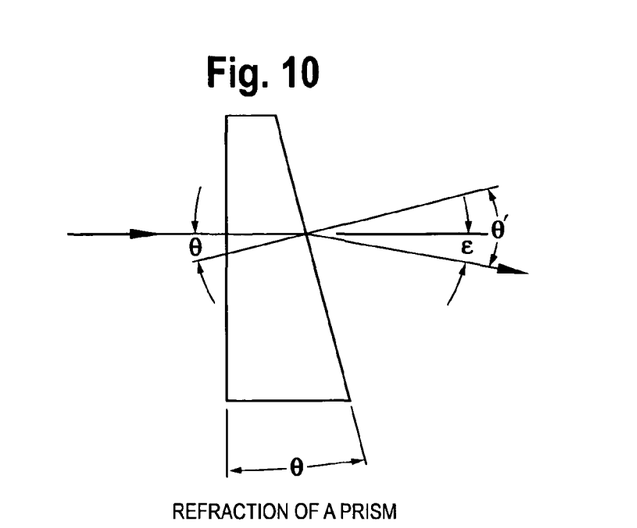
FIG. 10 is an illustration of refraction of a prism.

The comparison of the indices of refraction of Cleartran™ and a common optical glass, N-BK7, is shown in FIGS. 9A and 9B, respectively. While the index variance with wavelength for Cleartran™ is small in the MWIR, it varies significantly in the V/NIR, and this gives rise to significant spectral smear even when wedge angles are small. Refraction by a prism at near-normal incidence is shown in FIG. 10. For a prism with a small wedge angle $\theta$, the deflection c of a near-normal incident ray is given by:

$$\epsilon = (N-1)\theta$$

where N is the refractive index of the prism material.

Figure 11:
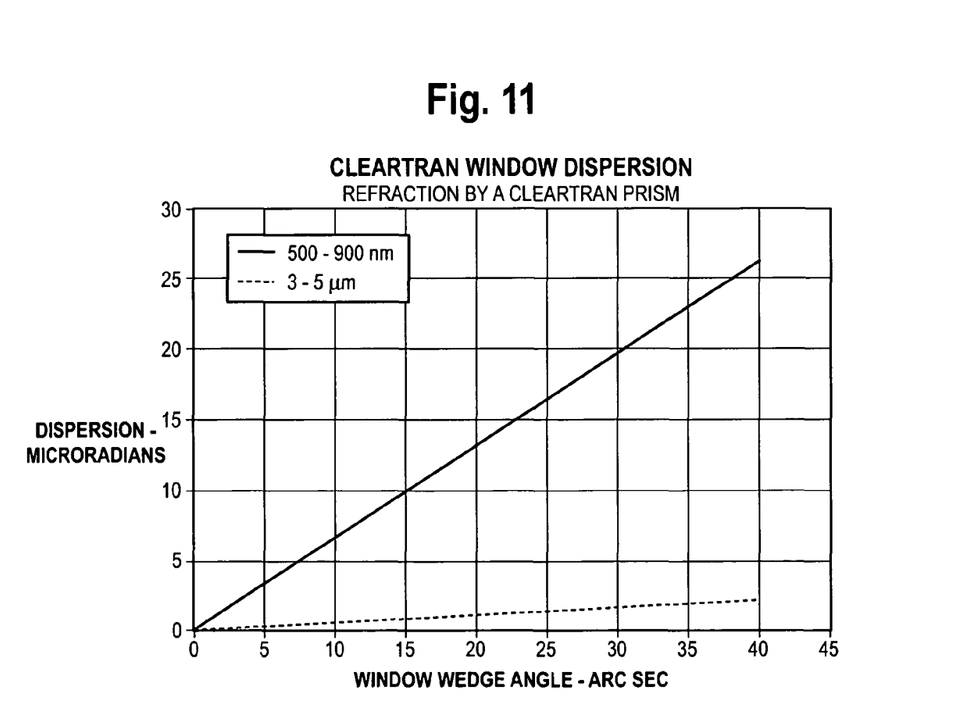
FIG. 11 is a plot of the dispersion produced by a Cleartran™ reconnaissance window in the form of a wedge, in the 500-900 nanometer (nm) and the 3.0-5.0 micrometer (μm) spectral wavebands as a function of the window wedge angle in arc-seconds.

Using the catalog values for the refractive index of Cleartran™, the dispersion as a function of wedge angle for a Cleartran™ window is shown in FIG. 11. It shows that a window wedge of 23 seconds of arc is needed to produce 15 μrads of dispersion across the 500-900 nm spectral band. This is about 3 pixels of dispersion at the focal plane image detector of a typical, current state of the art V/NIR electro-optical reconnaissance camera with a nominal 5 μrad instantaneous field of view (IFOV). As a check, it is noted that the dispersion in the MWIR for this wedge angle is less than 2 μrads, which is insignificant for a multiband band camera system imaging in the MWIR spectrum with a typical 20 μrad IFOV.

A wedge design point must be selected in the typical operating range of the reconnaissance camera system. Because the atmospheric wedge is range-dependent, it is necessary to choose a suitable design point range (distance from camera to scene) at which to null out the dispersion and to tolerate the overcorrection at shorter ranges and undercorrection at longer ranges. For shorter ranges, although the dispersion is overcorrected and produces some smear (in the depression direction only), the shorter lever arm of range limits the image spread at the focal plane of the imaging detector. At the longer ranges, where the dispersion is undercorrected, the residual dispersion smear is much smaller than the uncorrected smear and is considered an acceptable trade-off.

Figure 12:
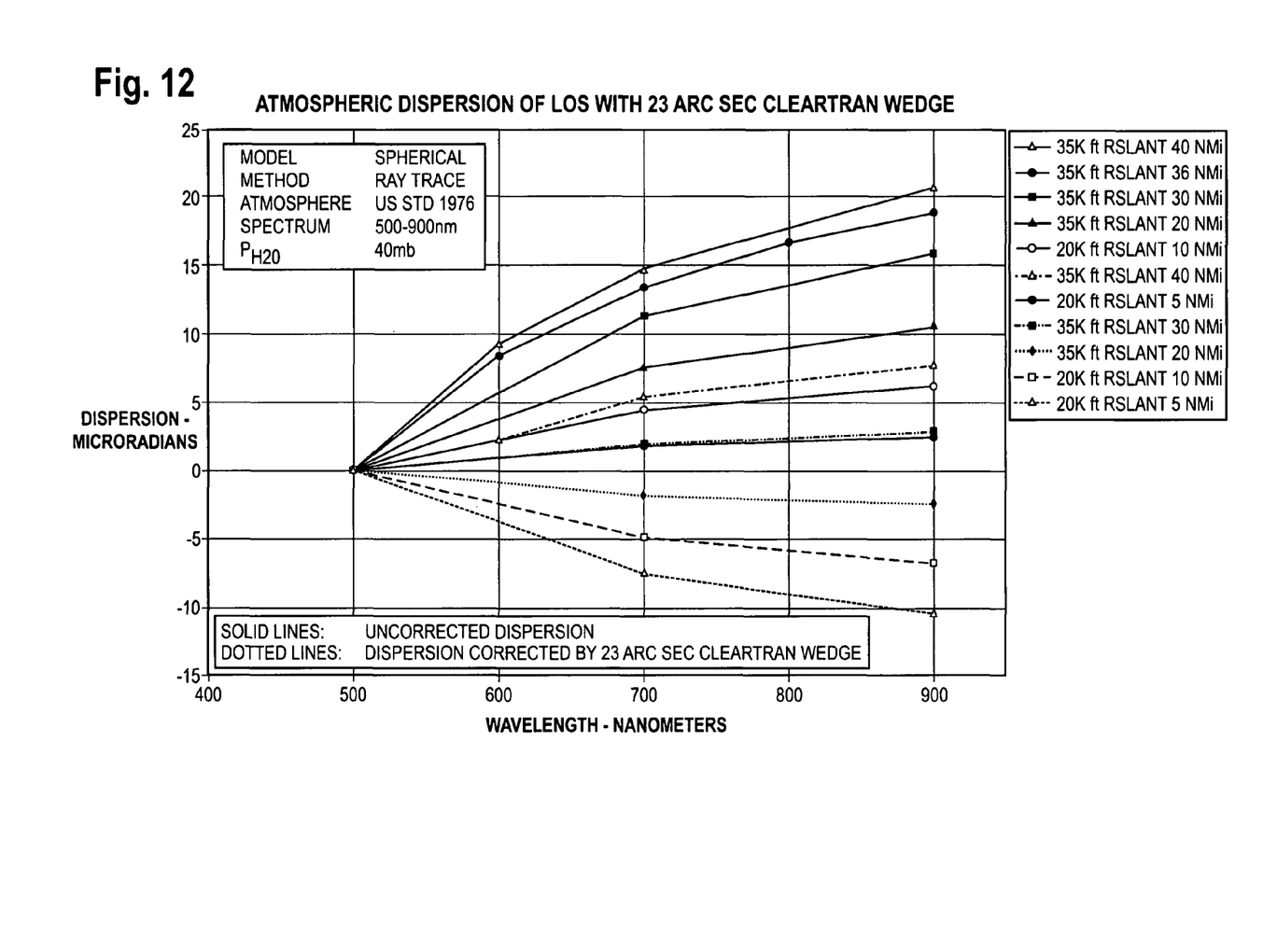
FIG. 12 is a plot of the residual dispersion vs. wavelength produced by a Cleartran™ reconnaissance window in the form of a single wedge having 23 arc-seconds of Wedge, at various altitude and slant ranges typical in LOROP reconnaissance missions.

As an example, to compensate for the 15 μrads of atmospheric dispersion typical at a 30 nautical mile slant range over the 500-900 nm spectral band, a Cleartran™ wedge of approximately 23 seconds of arc is required. For shorter ranges typical of a medium-altitude reconnaissance mission where the depression angles are greater than for LOROP, the wedged window will overcorrect the atmospheric dispersion. For example, at 10 NMi slant range, the atmospheric dispersion is about 7 μrads, and at 5 NMi about 3 μrads, and therefore the residual dispersion with the window in the optical path is 8 μrads at 10 nmi and 12 μrads at 5 NMi. Given that a typical medium-altitude reconnaissance camera has an IFOV of 20 μrads, the dispersion spread is much less than one IFOV, and the Corresponding modulation transfer function (MTF) is over 85% which is normally considered an insignificant degradation. FIG. 12 illustrates the residual dispersion at various slant ranges when using a Cleartran™ window having 23 seconds of arc. At ranges beyond 30 nmi range, the atmospheric dispersion will be undercompensated, and at ranges under 30 nmi, the dispersion will be slightly overcompensated. However, the degradation due to incorrect compensation is a weak function of range, after the dominant fraction of the dispersion is compensated.

From the above discussion, the present inventors have come to the following conclusion and insights:

1. The atmosphere has a dispersive effect on imaging light, particularly at shallow depression angles. From a view point above the Earth, the atmospheric wedge is oriented in the vertical direction only, the direction of refractive index variation. There is no lateral component. The optically thicker part of the atmospheric wedge is at the surface of the Earth, since the refractive index is highest at the surface.
2. Using multiple independent methods for calculation, the magnitude of the effective wedge angle of the atmosphere has been calculated, along with its dependence on and sensitivity to altitude and slant range.
3. Compensation of the atmospheric wedge using a deliberate fixed wedge in the optical path of the camera and incorporated into the reconnaissance camera viewing window is possible, and is a practical, simple and effective solution to atmospheric dispersion compensation. In the case of the window forming the wedge (FIG. 2A, 2B), if the window material has significant dispersion in the visible spectrum, as Cleartran™ has, this can be taken into account in the design of the window to produce the desired amount of dispersion to counteract the dispersion produced by the atmosphere. If a design point range is chosen, the atmospheric wedge will be under-corrected at longer slant ranges and overcorrected at shorter ranges. On the short side (less range), the reductions in slant range tend to compensate for the wedge-induced smear. And at higher ranges, the smear is smaller than it would be, uncorrected.
4. It is a requirement that the compensating window must have its thick side upward (away from the Earth), or the atmospheric wedge is enhanced, not reduced. Therefore, a reconnaissance viewing window that is moveable across the aircraft nadir should not be used to compensate for atmospheric wedge, since it would add to atmospheric wedge when positioned on one side of the host aircraft and subtract when positioned on the other side.
5. Correction in the orthogonal direction is neither necessary nor possible using a simple window wedge.

As used herein, the term "reconnaissance aircraft" is intended to include not only the vehicle itself but also attached appurtenances that may be present in the aircraft, such as a reconnaissance pod or bay in which a reconnaissance camera is carried or mounted.

As used herein the terms "LOROP" or equivalently "Long Range Oblique Photography reconnaissance camera" refer to a high altitude camera which has a long focal length optical system, typically greater than 50 inches, and is designed or used to capture images from altitudes of 20,000 to approximately 50,000 feet above the Earth's surface.

As used herein, the term "medium altitude reconnaissance camera" refers to a camera having an optical system with a focal length shorter than found on a LOROP camera, typically up to 18 inches, and which is designed or used to capture images from altitudes of 2,000 to 20,000 feet above the Earth's surface.

In one possible embodiment, the aerial reconnaissance camera system is designed to operate in a spectral band between 500 and 900 nanometers and in a spectral band between 3.0 and 5.0 micrometers. Such a camera is referred to as an example of a dual band camera system. An example of a dual band framing reconnaissance camera is shown in U.S. Pat. No. 6,694,094. The invention and methods for compensation for atmospheric dispersion can thus be applied to so-called "dual band" camera systems as well.

Variations from the specifics of the illustrated embodiments may of course be made while taking advantage of the above observations and conclusions, without departure from the scope of the invention. All questions concerning scope are to be made by reference to the appended claims.

We claim:

1. An aerial reconnaissance camera system comprising an imaging detector and an optical system for installation in an airborne reconnaissance vehicle, wherein an optical path exists between a scene to be imaged on the Earth and the imaging detector, the aerial reconnaissance camera system further comprising:
a fixed optical wedge incorporated into the optical path in front of the optical system, the wedge having a relatively thin edge and a relatively thick edge, with the wedge oriented in a manner such that the relatively thin edge is oriented towards the Earth and the relatively thick edge is oriented away from the Earth, the wedge having dispersive properties opposite from the expected net atmospheric dispersion in the optical path between the airborne reconnaissance vehicle and the scene during a reconnaissance mission using the camera.

2. The aerial reconnaissance camera system of claim 1, wherein the reconnaissance camera system includes a window providing an interface between the reconnaissance camera and the environment exterior of the reconnaissance vehicle, and wherein the window comprises the optical wedge.

3. The aerial reconnaissance camera system of claim 1, wherein the reconnaissance camera system includes a reconnaissance pod having a window providing an interface between the reconnaissance camera and the environment exterior of the reconnaissance pod, and wherein the window comprises the optical wedge.

4. The aerial reconnaissance camera system of claim 1, wherein the wedge produces a dispersion of between 10 and 30 microradians for incident light having a wavelength of between 500 and 900 nanometers.

5. The aerial reconnaissance camera system of claim 1, wherein the camera system comprises a Long Range Oblique Photography reconnaissance camera.

6. The aerial reconnaissance camera system of claim 1, wherein the camera comprises a medium altitude reconnaissance camera.

7. The aerial reconnaissance camera system of claim 1, wherein the reconnaissance mission comprises photographing the Earth at a range to the scene of between 10 and 50 nautical miles.

8. The aerial reconnaissance camera system of claim 2, wherein the window comprises a zinc sulfide optical material.

9. The aerial reconnaissance camera system of claim 3, wherein the window comprises a zinc sulfide optical material.

10. An aerial reconnaissance camera system for installation in an airborne reconnaissance vehicle, wherein an optical path exists from a scene to be imaged on the Earth and the camera, the camera system comprising:
    an imaging detector,
    a window providing an interface between the reconnaissance camera and the environment exterior of the reconnaissance vehicle; and
    an optical system directing light from the scene from the window to the imaging detector;
    wherein the window comprises a fixed optical wedge having a relatively thin edge and a relatively thick edge, with the wedge oriented in a manner such that the relatively thin edge is oriented towards the Earth and the relatively thick edge is oriented away from the Earth, the wedge having dispersive properties opposite from the expected atmospheric dispersion in the optical path between the airborne reconnaissance vehicle and the scene during a reconnaissance mission using the camera.

11. The aerial reconnaissance camera system of 10, wherein the imaging detector comprises an electro-optical image detector array.

12. The aerial reconnaissance camera system of claim 10, wherein the window produces a dispersion of between 10 and 30 microradians for incident light having a wavelength of between 500 and 900 nanometers.

13. The aerial reconnaissance camera system of claim 10, wherein the camera comprises a Long Range Oblique Photography reconnaissance camera.

14. The aerial reconnaissance camera system of claim 10, wherein the camera comprises a medium altitude reconnaissance camera.

15. The aerial reconnaissance camera system of claim 13, wherein the reconnaissance mission comprises photographing the Earth at a range to the scene of between 10 and 50 nautical miles.

16. The aerial reconnaissance camera system of claim 10, wherein the window comprises a zinc sulfide optical material.

17. A method of compensating for atmospheric dispersion in an aerial reconnaissance camera system for installation in an airborne reconnaissance vehicle, the camera system having an imaging detector and an optical system, wherein an optical path exists between a scene to be imaged on the Earth and the imaging detector, comprising the step of:
    placing a fixed optical wedge in the optical path in front of the optical system, the wedge having a relatively thin edge and a relatively thick edge, with the wedge oriented in a manner such that the relatively thin edge is oriented towards the Earth and the relatively thick edge is oriented away from the Earth, the wedge having dispersive properties opposite from the expected net atmospheric dispersion in the optical path between the airborne reconnaissance vehicle and the scene during a reconnaissance mission using the camera system.

18. The method of claim 17, wherein the imaging detector comprises an electro-optical image detector array.

19. The method of claim 17, wherein the reconnaissance camera system includes a window providing an interface between the reconnaissance camera and the environment exterior of the reconnaissance vehicle, and wherein the window comprises the optical wedge.

20. The method of claim 17, wherein the wedge produces a dispersion of between 10 and 30 microradians for incident light having a wavelength of between 500 and 900 nanometers.

21. The method of claim 17, wherein the camera system comprises a Long range oblique photography reconnaissance camera.

22. The method of claim 17, wherein the camera system comprises a medium altitude reconnaissance camera.

23. The method of claim 17, wherein the reconnaissance mission comprises photographing the Earth at a range to the scene of between 10 and 50 nautical miles.

24. The method of claim 19, wherein the window comprises a zinc sulfide optical material.

25. The method of claim 17, wherein the camera system is designed to operate in a spectral band between 500 and 900 nanometers.

26. The method of claim 17, wherein the camera system is designed to operate in a spectral band between 500 and 900 nanometers and in a spectral band between 3.0 and 5.0 micrometers.

* * * * *